United States Patent
Jiang et al.

(10) Patent No.: US 7,712,206 B2
(45) Date of Patent: May 11, 2010

(54) METHOD FOR MANUFACTURING A MAGNETIC WRITE HEAD HAVING A TRAILING SHIELD WITH AN ACCURATELY CONTROLLED TRAILING SHIELD GAP THICKNESS

(75) Inventors: Ming Jiang, San Jose, CA (US); Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 867 days.

(21) Appl. No.: 11/439,297

(22) Filed: May 22, 2006

(65) Prior Publication Data

US 2007/0268625 A1 Nov. 22, 2007

(51) Int. Cl.
*G11B 5/127* (2006.01)
*H01R 31/00* (2006.01)
(52) U.S. Cl. .............. 29/603.16; 29/603.13; 29/603.14; 29/603.15; 29/603.18; 205/199; 205/122; 360/121; 360/122; 360/317; 451/5; 451/41
(58) Field of Classification Search .............. 29/603.07, 29/603.13–603.16, 603.18; 205/119, 122; 360/121, 122, 126, 317; 451/5, 41
See application file for complete search history.

(56) References Cited

U.S. PATENT DOCUMENTS

| 2005/0068665 | A1 | 3/2005 | Le et al. ................ 360/97.01 |
| 2005/0068669 | A1 | 3/2005 | Hsu et al. ................ 360/125 |
| 2005/0068673 | A1 | 3/2005 | Lille ................ 360/126 |
| 2005/0068678 | A1 | 3/2005 | Hsu et al. ................ 360/126 |
| 2007/0258167 | A1* | 11/2007 | Allen et al. ................ 360/126 |

* cited by examiner

*Primary Examiner*—Paul D Kim
(74) *Attorney, Agent, or Firm*—Zilka-Kotab, PC

(57) ABSTRACT

A method for constructing a magnetic write head for use in perpendicular magnetic recording, the write head having a write pole with a trailing shield. After forming a magnetic write pole such as by masking and ion milling a magnetic write pole layer, a thin layer of alumina is deposited. This is followed by the deposition of a thin layer of Rh. Then, a thick layer of alumina is deposited, having a thickness that is preferably at least equal to the height of the write pole layer. A chemical mechanical polish is then performed until a portion of the Rh layer over the top (trailing edge) of the write pole is exposed. A material removal process such as ion milling is then performed to remove the exposed Rh layer exposing the thin alumina layer there beneath. Since the Rh trailing gap layer is electrically conductive it can also serve as a seed layer for electroplating the magnetic trailing shield.

11 Claims, 17 Drawing Sheets

METHOD FOR MANUFACTURING A MAGNETIC WRITE HEAD HAVING A TRAILING SHIELD WITH AN ACCURATELY CONTROLLED TRAILING SHIELD GAP THICKNESS

FIELD OF THE INVENTION

The present invention relates to perpendicular magnetic recording and more particularly to a method for manufacturing a perpendicular magnetic write head with a trailing shield having a very well controlled trailing shield gap.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (i.e. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. Alternatively, the shield can be a stitched design, wherein the shield is magnetically connected with the return pole. Various dimensions of the shield are critical for the trailing shield to operate correctly. For instance, effective angling or canting of the effective flux field is optimized when the write pole to trailing shield separation (gap) is about equal to the head to soft underlayer spacing (HUS) and the trailing shield throat height is roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively. In order for a trailing shield to function optimally, the thickness of the trailing shield gap must be tightly controlled. Therefore, there is a need for a means for accurately controlling such trailing gap thickness during manufacture.

Therefore, there is a need for a method for manufacturing a perpendicular write head that can produce a trailing shield with a well controlled trailing gap thickness. Such a method would also preferably produce a trailing shield with a straight flat leading edge and constant, consistent trailing gap thickness.

SUMMARY OF THE INVENTION

The present invention provides a method for manufacturing a magnetic write head for use in perpendicular magnetic recording, the write head having a trailing magnetic shield. The method includes forming a magnetic write pole, and then depositing a layer of alumina over the write pole. A layer of Rh is then deposited over the alumina layer. Another layer of alumina is then deposited, this layer being thicker than the previously deposited alumina and Rh layers. A chemical mechanical polish is then performed to expose a portion of the Rh layer. This exposed portion of the Rh layer is then removed, such as by an ion mill. The underlying alumina layer can then be removed or can be left to form part of the trailing shield gap. Then, another layer of Rh is deposited to provide a non-magnetic trailing shield gap. A magnetic shield material is then deposited to form the trailing magnetic shield.

Because the trailing shield is not a wrap around shield design, the first deposited layer of Rh can be deposited thin, such as 20-40 nm. Similarly, the first alumina layer can be deposited thin, such as 5 to 20 nm thick. The second deposited alumina layer preferably is deposited at least as thick as the magnetic write pole material.

A method according to the present invention advantageously allows the trailing shield gap to be constructed to a very precise, well controlled thickness and also provides a flat straight surface on which to form the trailing magnetic shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
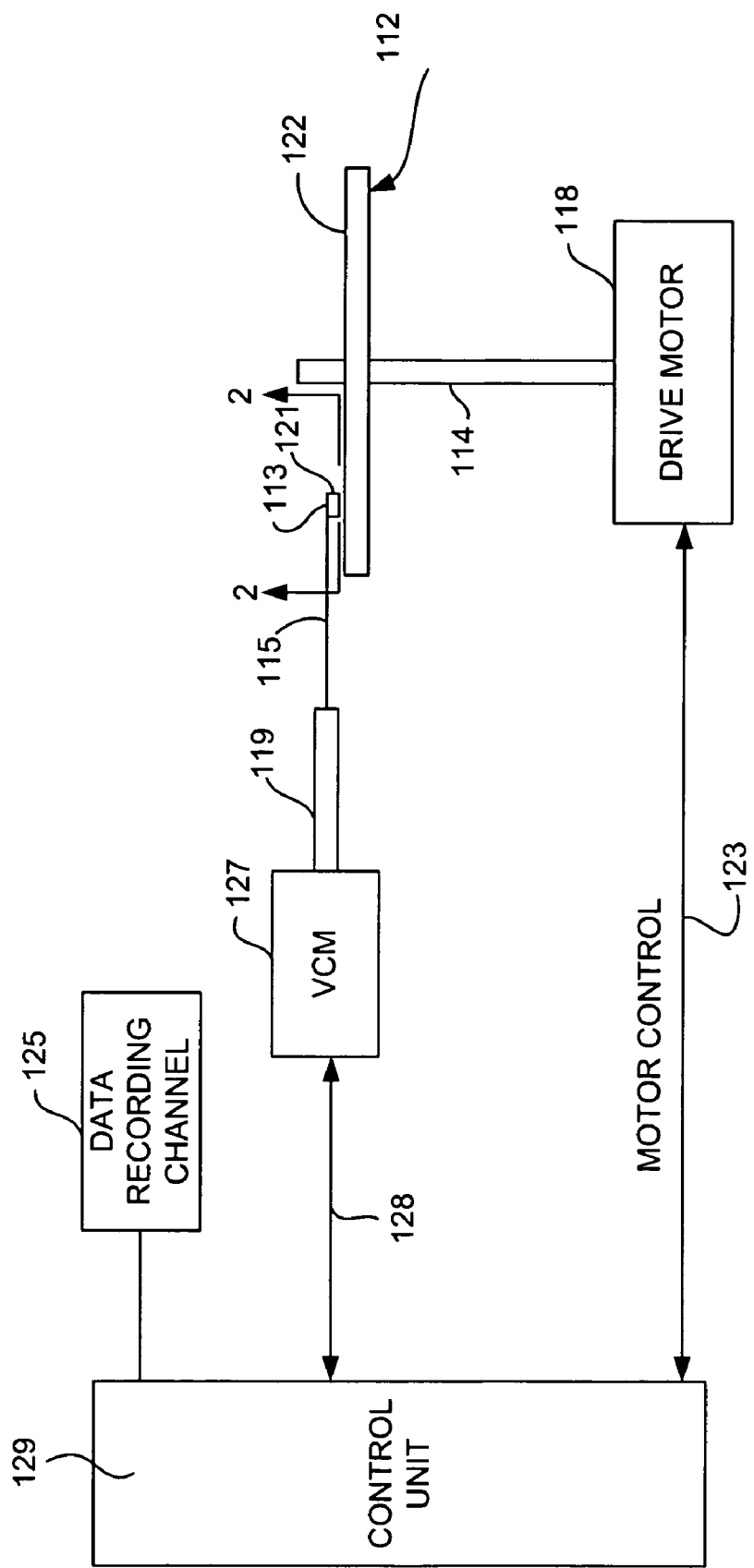
FIG. 1 is a schematic illustration of a disk drive system.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
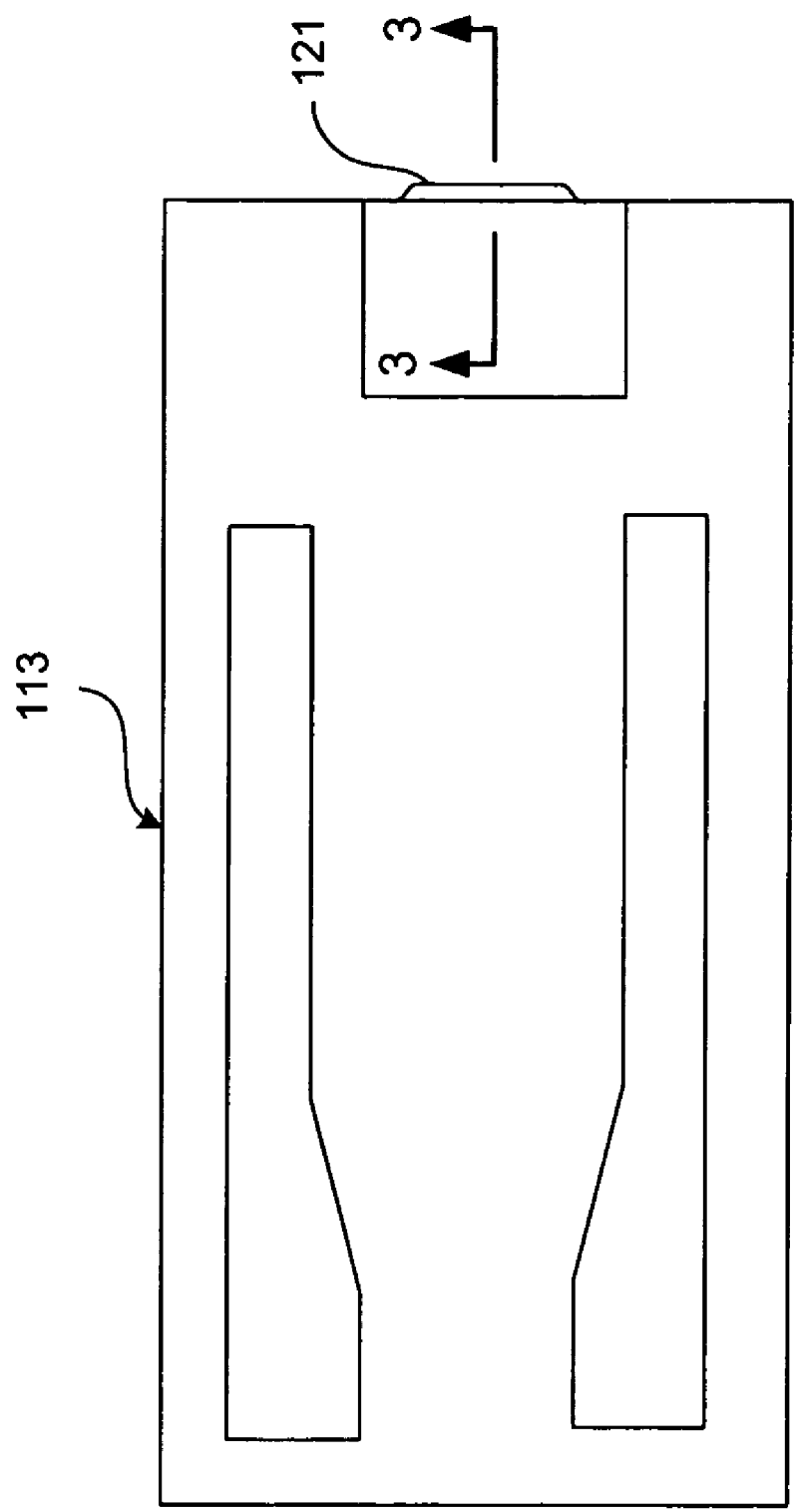
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
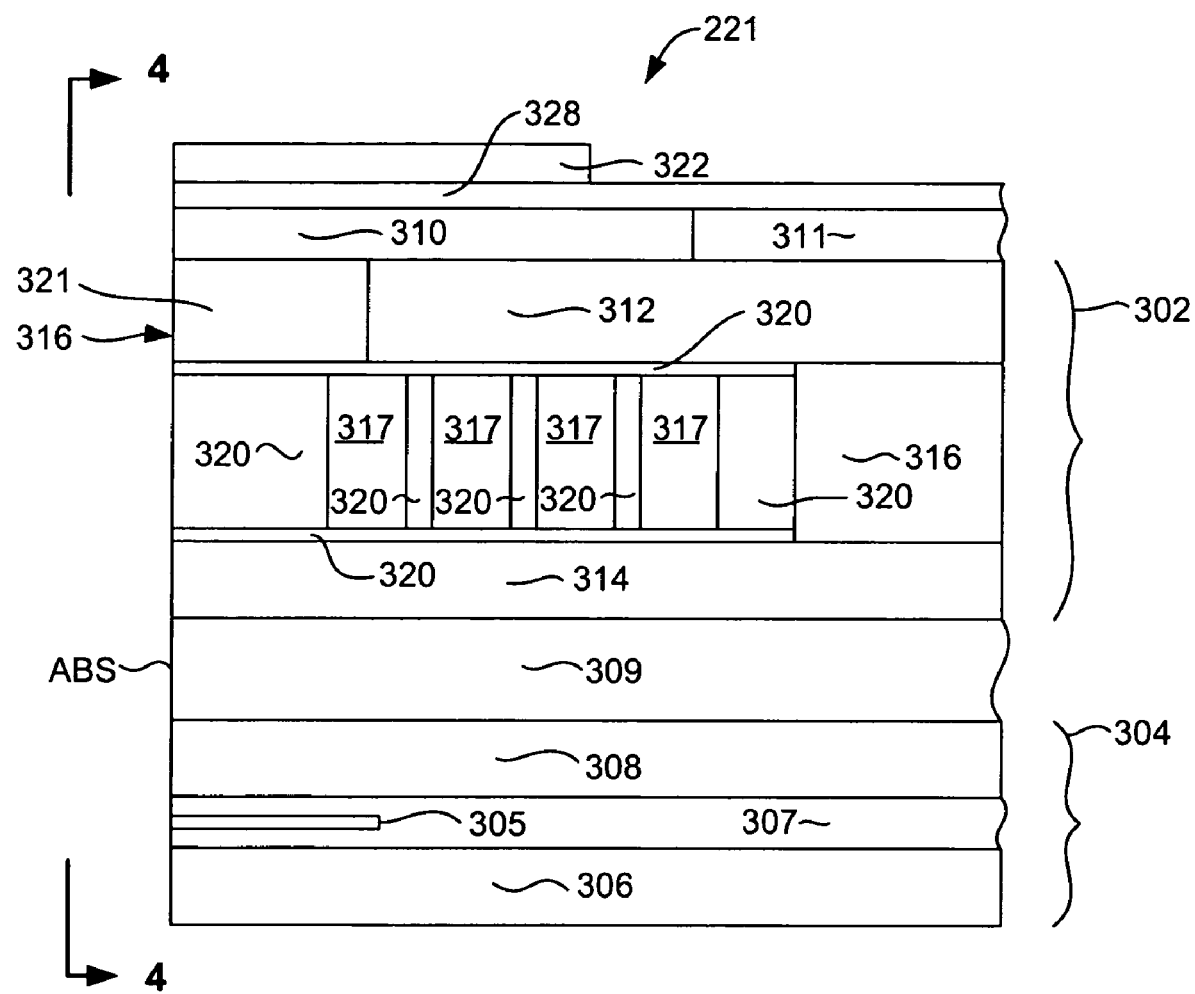
FIG. 3 is a cross sectional view, taken from line 3-3 of FIG. 2 and rotated 90 degrees counterclockwise, of a magnetic head according to an embodiment of the present invention.

With reference now to FIG. 3, the magnetic head 221 for use in a perpendicular magnetic recording system is described. The head 221 includes a write element 302 and a read sensor 304. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 304 could be another type of sensor such as a current in plane (CIP) GMR sensor or, a tunnel junction sensor (TMR) or some other type of sensor. The sensor 304 is located between and insulated from first and second magnetic shields 306, 308 and embedded in a dielectric material 307. The magnetic shields, which can be constructed of for example CoFe or NiFe, absorb magnetic fields, such as those from up-track or down-track data signals, ensuring that the read sensor 304 only detects the desired data track located between the shields 306, 308. A non-magnetic, electrically insulating gap layer 309 may be provided between the shield 308 and the write head 302.

Figure 4:
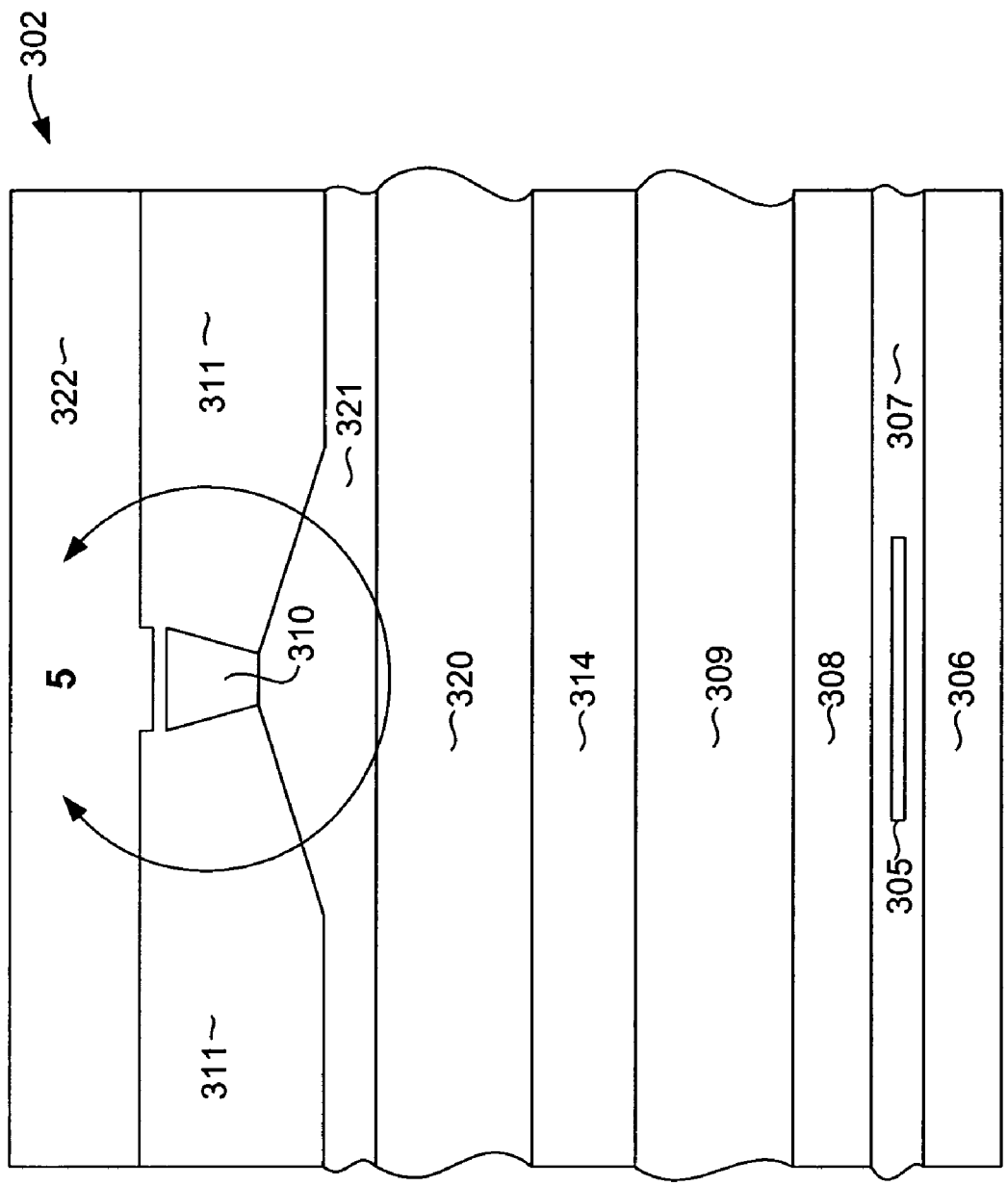
FIG. 4 is an ABS view of the write head taken from line 4-4 of FIG. 3.

With continued reference to FIG. 3, the write element 302 includes a write pole 310 that is magnetically connected with a magnetic shaping layer 312, and is embedded within an insulation material 311. As shown in FIG. 4, the write pole has a small cross section at the air bearing surface and is constructed of a material having a high saturation moment, such as NiFe or CoFe. The shaping layer 312 is constructed of a magnetic material such as CoFe or NiFe and has a cross section parallel to the ABS surface that is significantly larger than that of the write pole 310.

The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field 321 to be emitted toward an adjacent magnetic medium. The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials.

Figure 5:
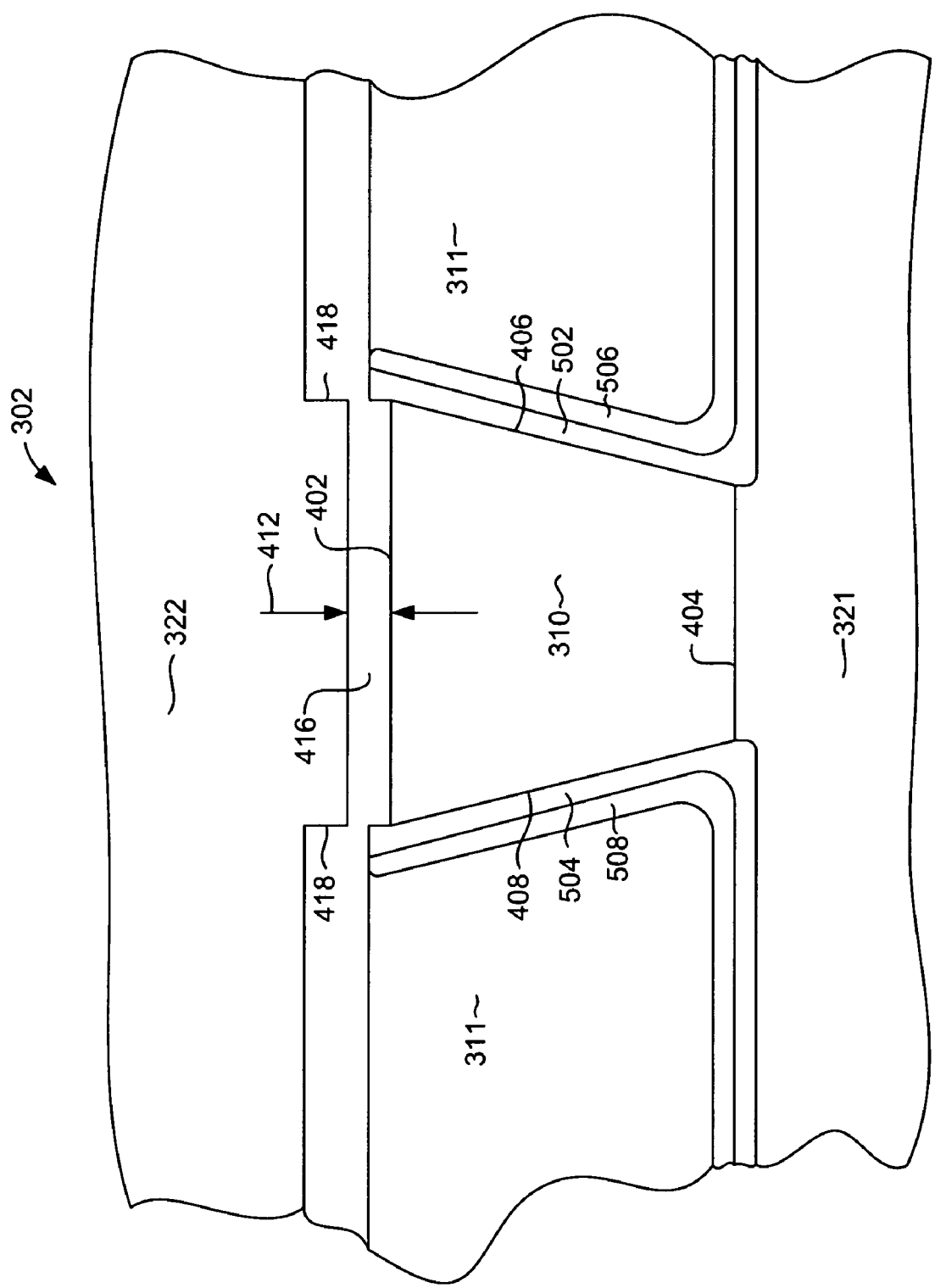
FIG. 5 is an ABS view taken from circle 5 of FIG. 4.

The write head element 302 also includes a trailing shield 322, and with reference to FIG. 5 the configuration of the write pole 310 and an adjacent portion of the trailing shield 322 are shown enlarged and in greater detail. The write pole 310 has a trailing edge 402 and a leading edge 404. The terms trailing and leading are with respect to the direction of travel along a data track when the write head 302 is in use. The write pole 310 also preferably has first and second laterally opposing sides 406, 408 that are configured to define a width at the leading edge 404 that is narrower than the width at the trailing edge 404, forming a write pole 310 having a trapezoidal shape. This trapezoidal shape is useful in preventing adjacent track writing due to skew of the write head 302 when the head 302 is located at extreme outer or inner positions over the disk. However, this trapezoidal shape of the write head 310 is not necessary to practice the present invention.

With continued reference to FIG. 5, the magnetic trailing shield 322 is separated from the trailing shield, by a trailing gap 412, which is preferably constructed of an electrically conductive, non-magnetic material such as Rh and may or may not include a thin layer of alumina beneath the Rh layer directly adjacent to the trailing edge 402 of the write pole 310. As can be seen with reference to FIG. 5, the trailing shield 322 can be configured with notches 418 that are aligned with either side 406, 408 of the write pole 310. The trailing shield 322 can be constructed of a magnetic material such as NiFe. A non-magnetic fill material 311, which is preferably alumina fills the areas to either side of the write pole 310. In addition, there may be thin layers 502, 504 alumina extending along the sides 406, 408 of the write pole 310. In addition, there may be layers 506, 408 of a material such as Rh 504 extending over the layers 502, 504, between the layers 502, 504 and the fill layers 311. The layers 502, 504 506, 508 may also extend over the surface of the substrate 321 as shown. The layers 502 and 504, 506 and 508 are remnants of a manufacturing process that will be described in greater detail herein below.

Figure 6:
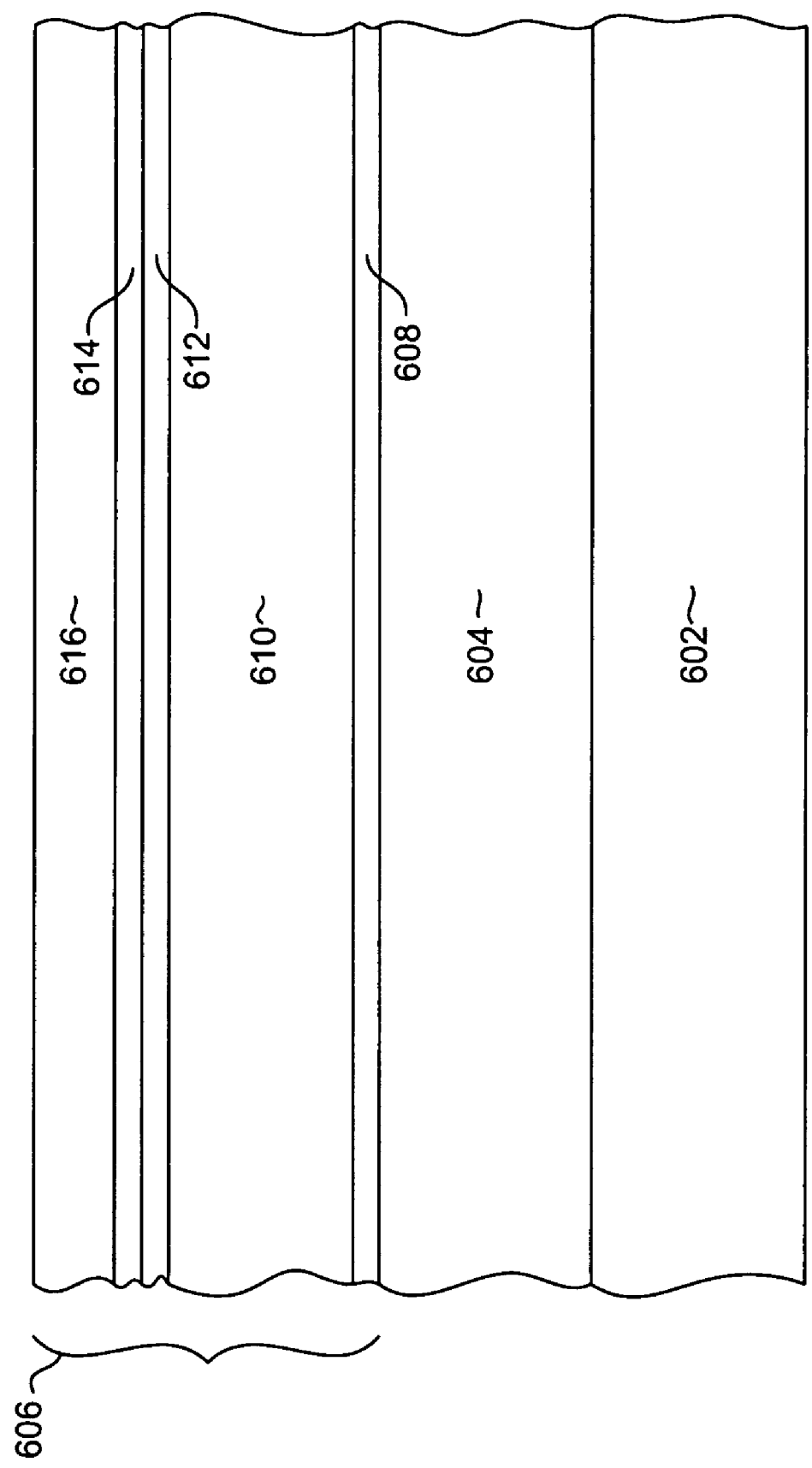
FIGS. 6-17 are ABS views similar to those of FIGS. 4 and 5, showing a magnetic head in various intermediate stages of manufacture and illustrating a method of manufacturing a magnetic head according to an embodiment of the invention.

With reference now to FIGS. 6 through 15, a method for constructing a write pole and a wrap around trailing shield according to an embodiment of the invention is described. With particular reference to FIG. 6, a substrate layer 602 is provided. The substrate can include the non-magnetic fill layer 321 and the shaping layer 312 on which the write pole 310 is to be formed as shown in FIG. 3. One or more layers of write pole material 602 are deposited over the substrate 602. The write pole layer 604 preferably is a lamination of magnetic layers such as CoFe with thin layers of non-magnetic material sandwiched between the magnetic layers.

A plurality of mask layers 606 are deposited over the write pole layer (lamination) 602. The mask layers include a hard mask layer 608, which is preferably constructed of alumina. The mask layers 606 also may include an image transfer layer 610, a second or top hard mask 612 and a second or top hard image transfer layer 614. The image transfer layers 610, 614 can be constructed of a soluble polyimide solution such as DURIMIDE®. The top hard mask layer 612 can be constructed of a material such as $SiO_2$. The mask layers 606 also include a layer of resist material deposited at the top of the mask layers 606. The resist layer 616 can be a photoresist or an electron beam (e-beam) resist.

Figure 7:
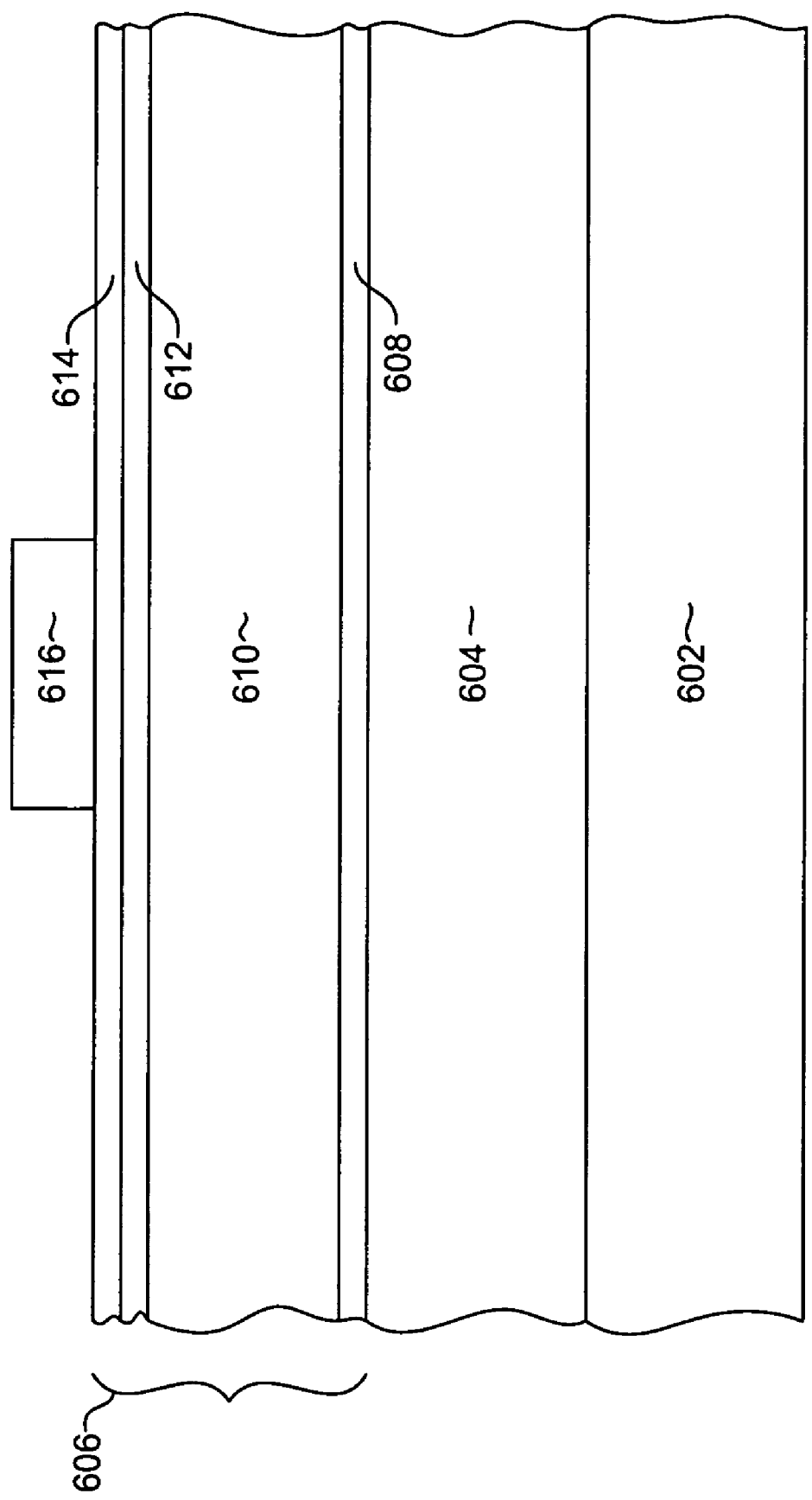
Figure 8:
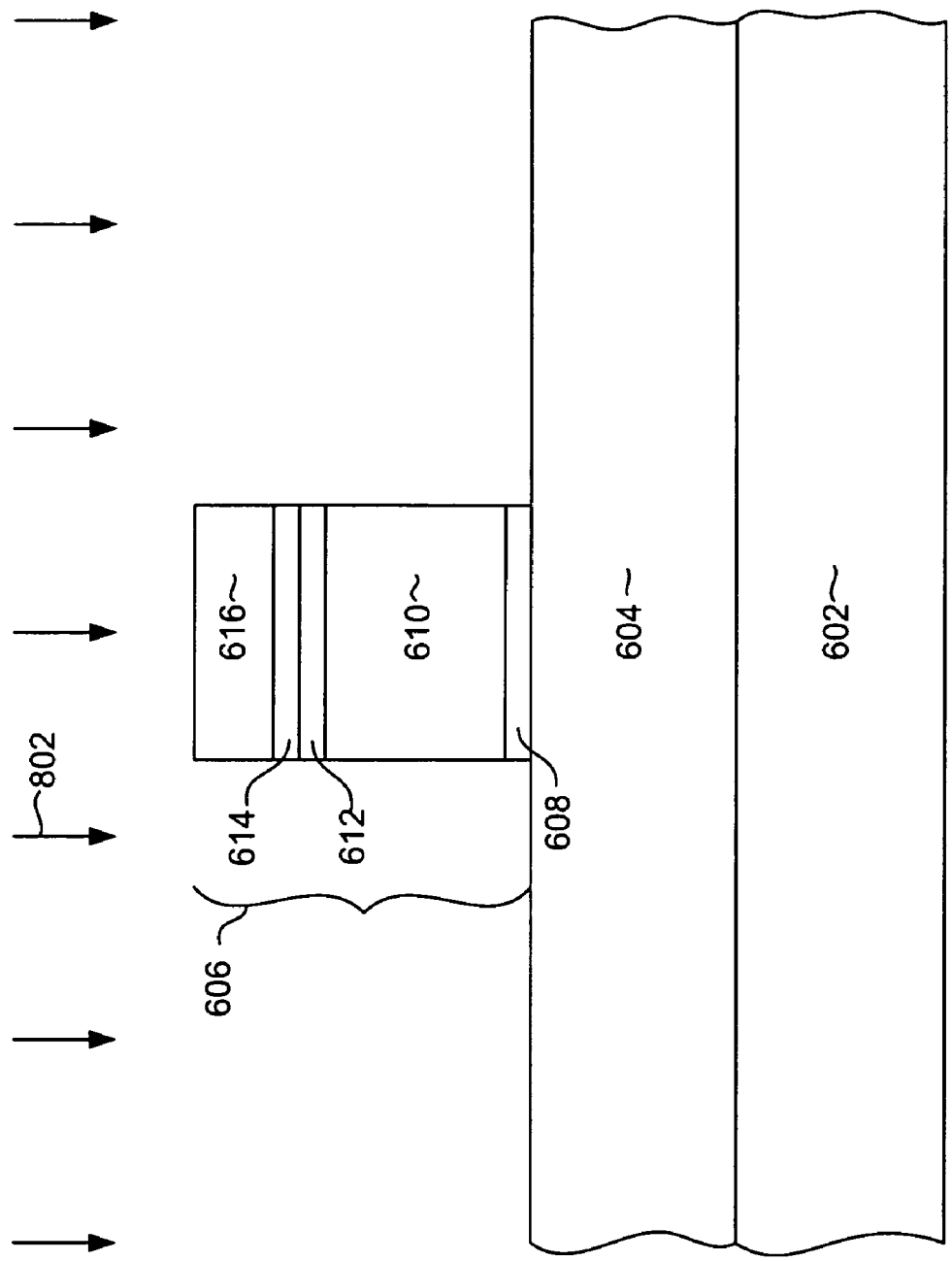

With reference to FIG. 7, the resist layer 616 is photolithographically patterned and developed to construct a photo mask 616 having a width that will define the track width of a write pole to be formed. Then, with reference to FIG. 8, one or more material removal processes 802 are performed to transfer the image of the resist layer 616 onto the underlying mask layers 608-614. The one or more material removal processes 802 may include one or more of reactive ion etching (RIE), ion milling, or reactive ion milling (RIM).

Figure 9:
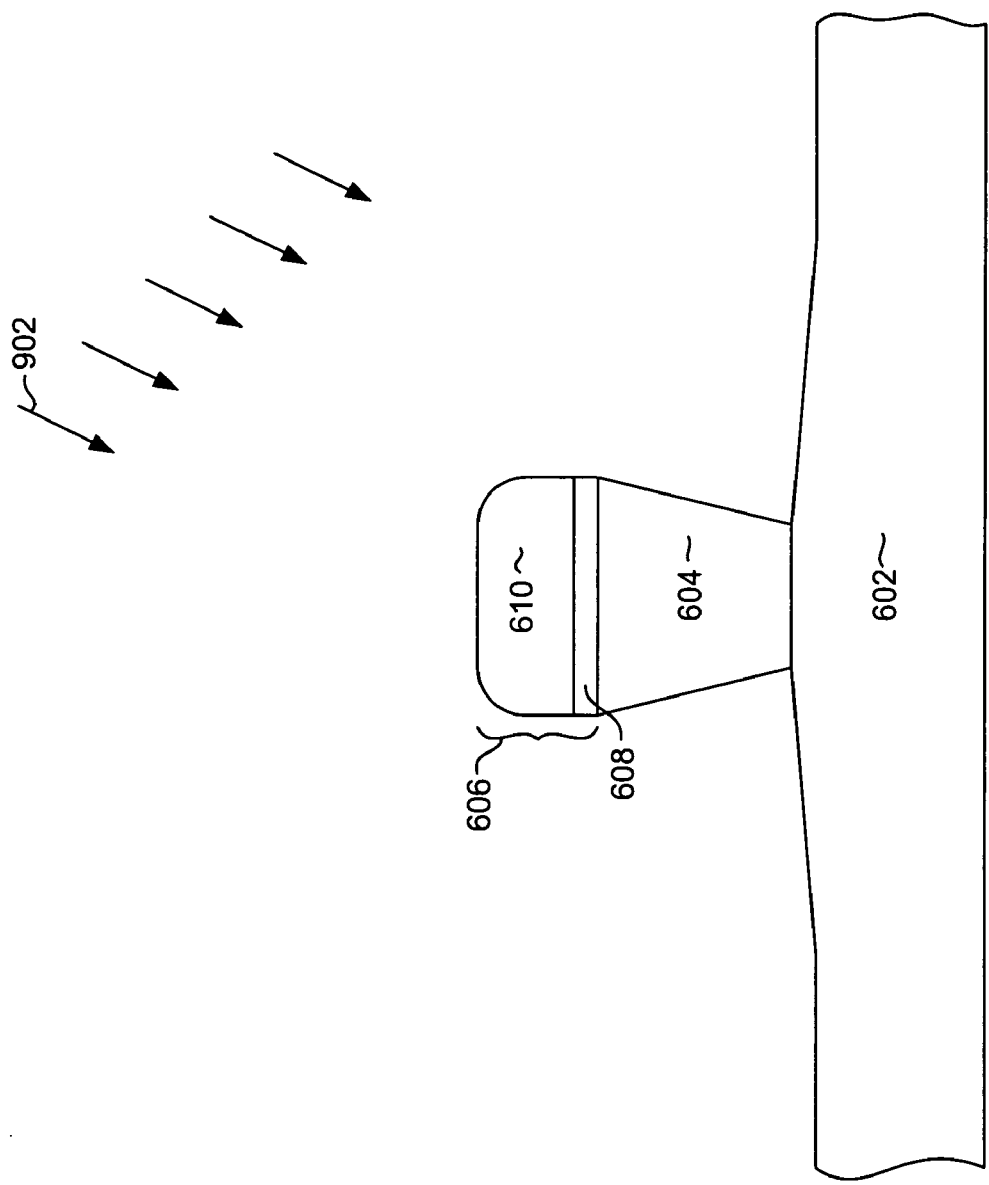

Then, with reference to FIG. 9, an ion mill 902 is performed to remove portions of the magnetic write pole material 604 that are not covered by the mask structure. The process of ion milling 902 to form the write pole also removes the resist layer 616, top image transfer layer 614, top hard mask 612, and all or a portion of the image transfer layer 610. The ion mill 902 is preferably performed at an angle, or at a series of varying angles, to form the write pole 604 with a desired trapezoidal shape having inward tapering side walls.

Figure 10:
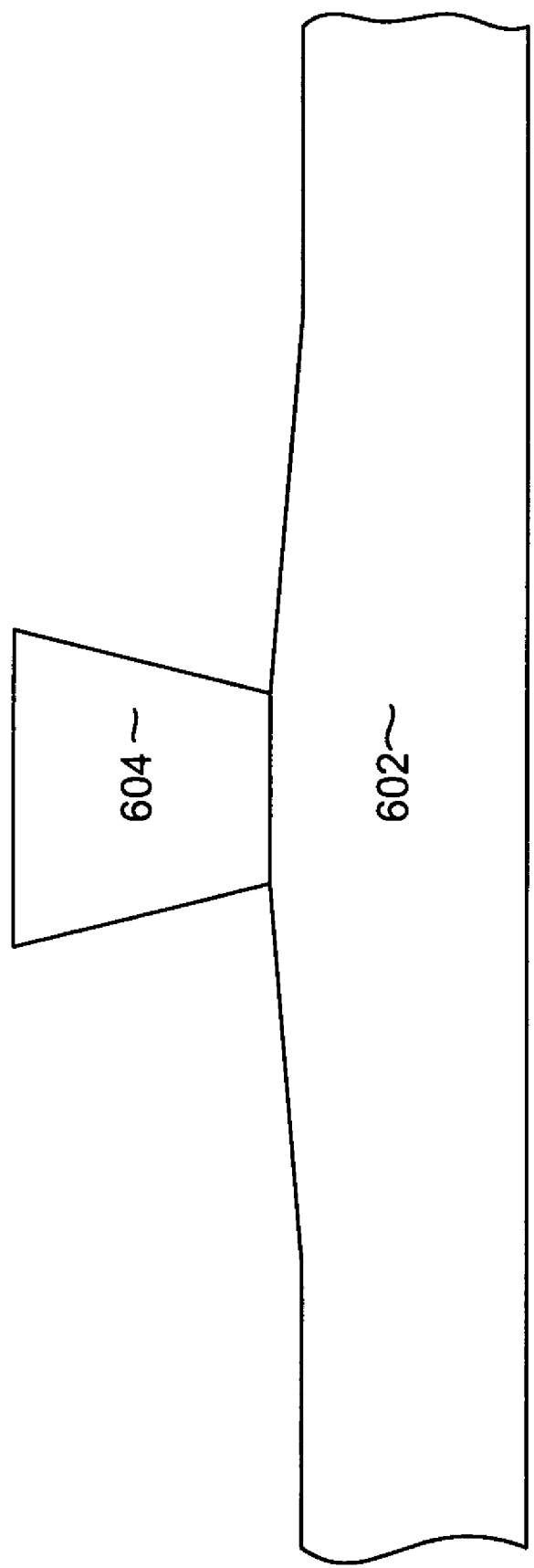
Figure 11:
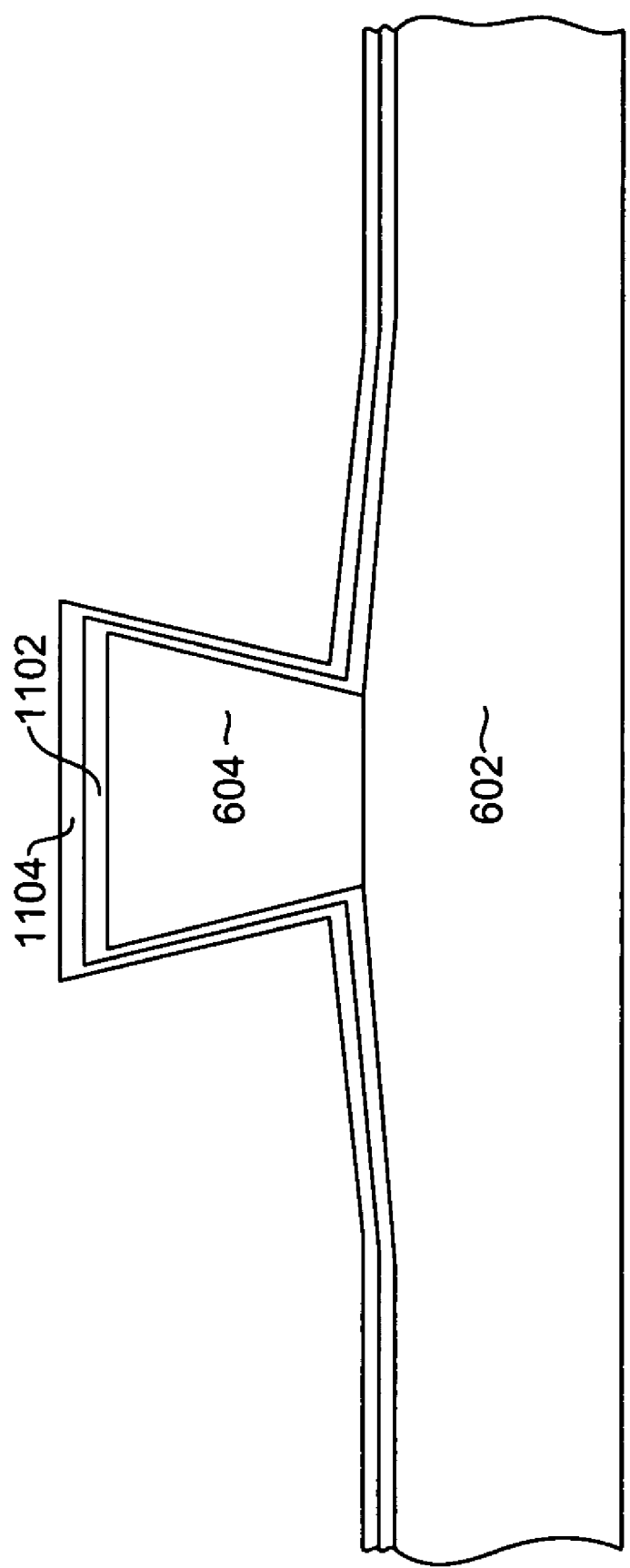

With reference to FIG. 10, the remaining mask layers 608, 610 can be removed such as by etching with a resist protected TMAH or with a developer etch. Then, with reference to FIG. 11, a layer of alumina 1102 is deposited over the write pole 604 and substrate 602. A layer of Rh 1104 is then deposited over the alumina layer 1102. The alumina layer 1102 and Rh layer 1104 are preferably deposited by a conformal deposition method such as atomic layer deposition (ALD) chemical vapor deposition (CVD), etc. The alumina layer 1102 can be deposited to a thickness of 5-20 nm or about 10 nm. The Rh layer 1104 can be deposited to a thickness of 20 to 40 nm or about 30 mm. As can be seen, the alumina and Rh layers 1102, 1104 extend over the sides of the write pole 604. However, because the trailing shield to be formed is not a wrap around shield structure, the Rh layer can be significantly thinner than necessary in a wrap around shield design, since there is no need to accommodate side shield spacing.

Figure 12:
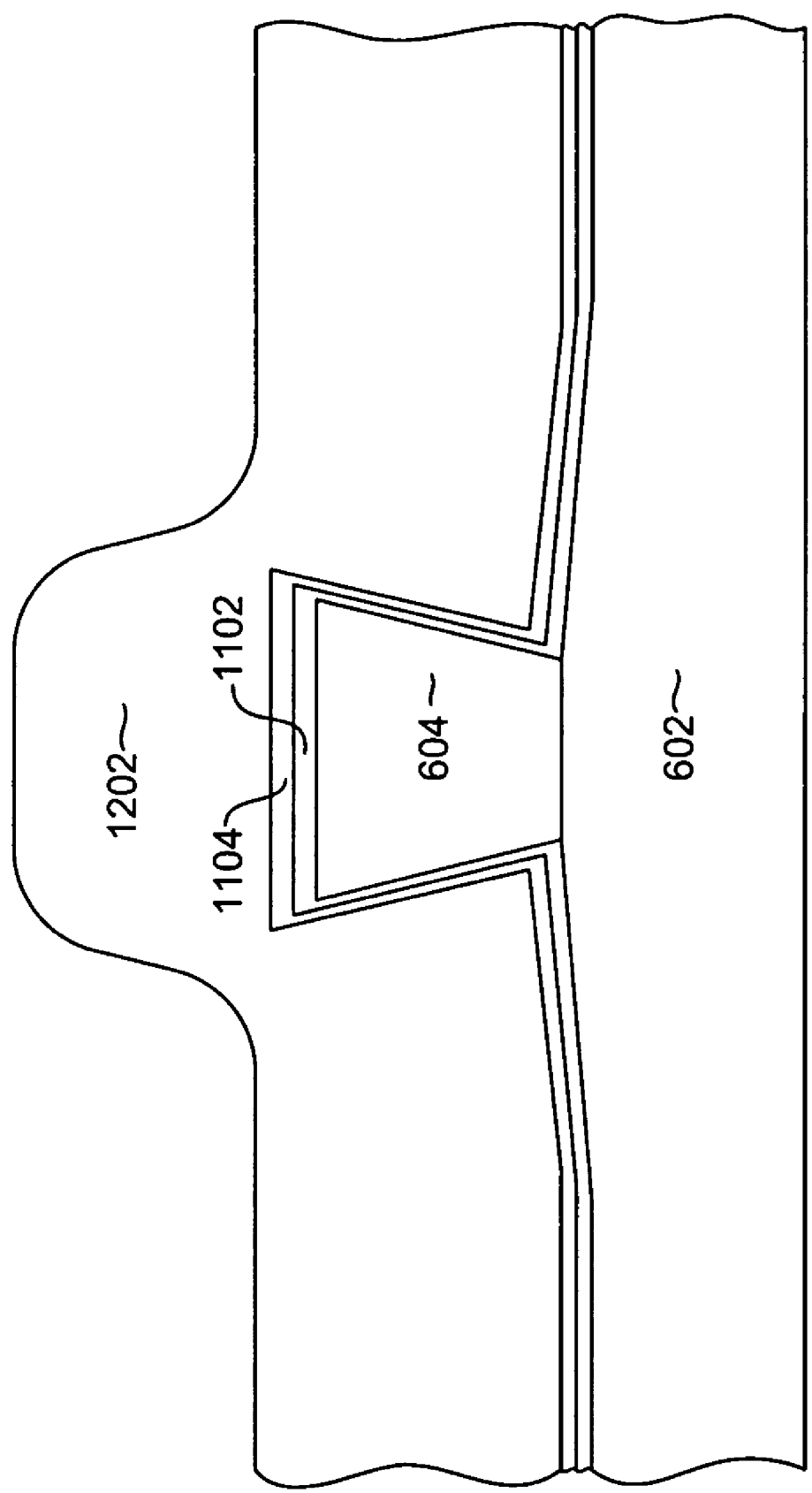
Figure 13:
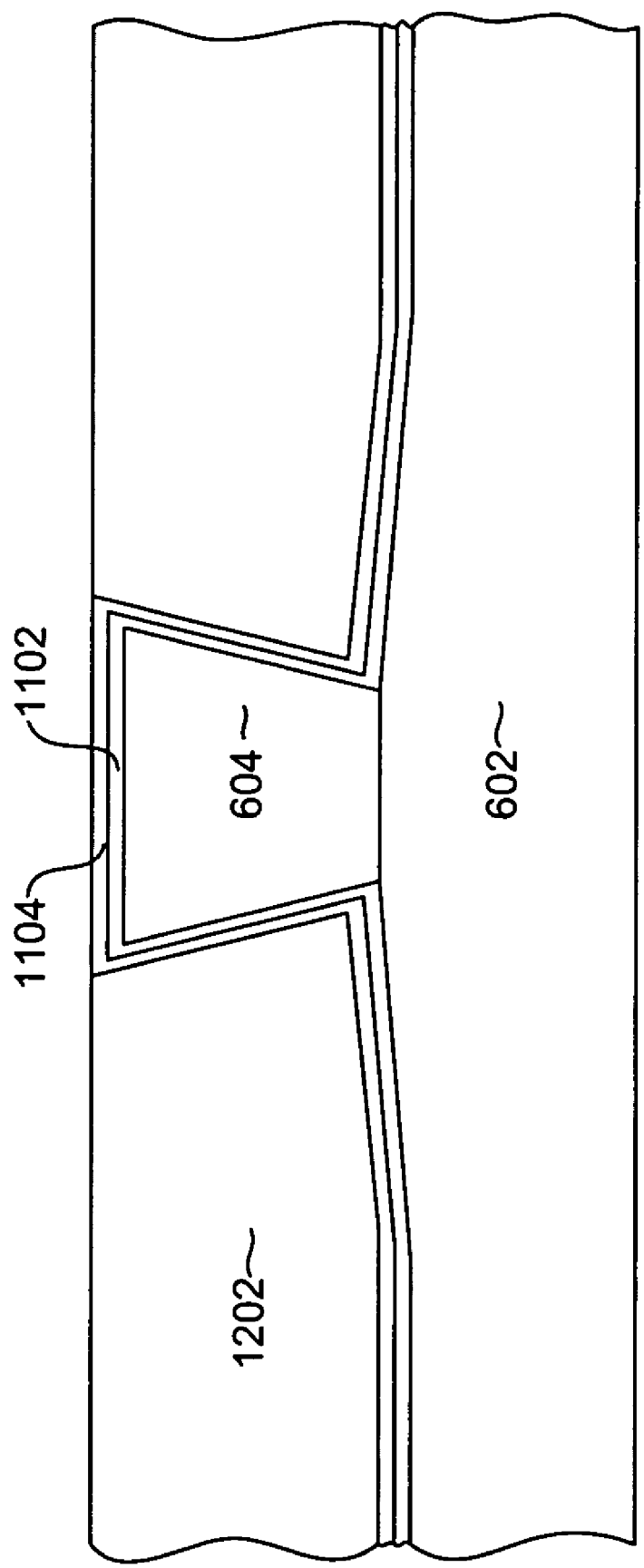

With reference now to FIG. 12, a thick layer of alumina 1202 is deposited. This alumina layer can be 400 nm thick or greater, and is preferably about 500 nm thick. The thick alumina layer 1202 is preferably has a thickness such that it extends to a height at least to the top of the write pole 604 in areas beside (outside of) the write pole 604. Then, with reference to FIG. 13, a chemical mechanical polish (CMP) is performed to planarize the alumina layer 1202, exposing the Rh layer 1104. The Rh layer, being a hard material, makes an excellent CMP stop layer. An end point detection method is employed to determine that ion milling should terminate when the Rh layer 1104 has been removed and the underlying alumina layer 1202 has been reached.

Figure 14:
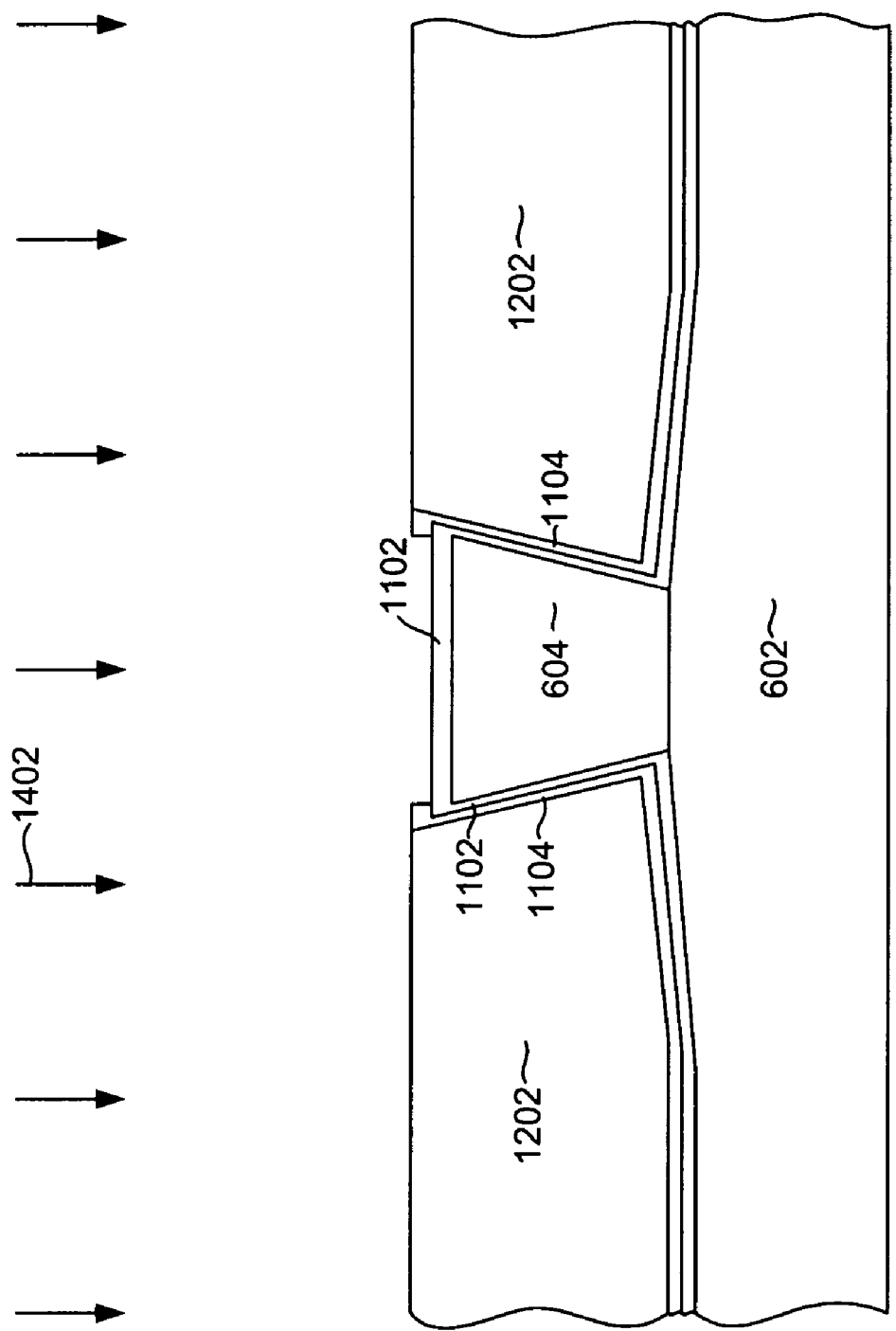

With reference now to FIG. 14, an ion mill 1402 is performed to remove the portion of the Rh layer 1102 that extends over the write pole 604. The underlying alumina layer 1102 is resistant to ion milling and can function as an end point detection layer for the ion mill process 1102. The alumina layer 1102 can protect the write pole 604 from being damaged or removed by the ion mill process 1402 used to remove the Rh layer. The CMP process described above with reference to FIG. 10 causes the Rh layer 1102 to have a curved upper surface. However, by removing this Rh layer by ion milling a flat surface is ensured for forming the trailing shield, as will become apparent upon further reading of this Detailed Description.

Figure 15:
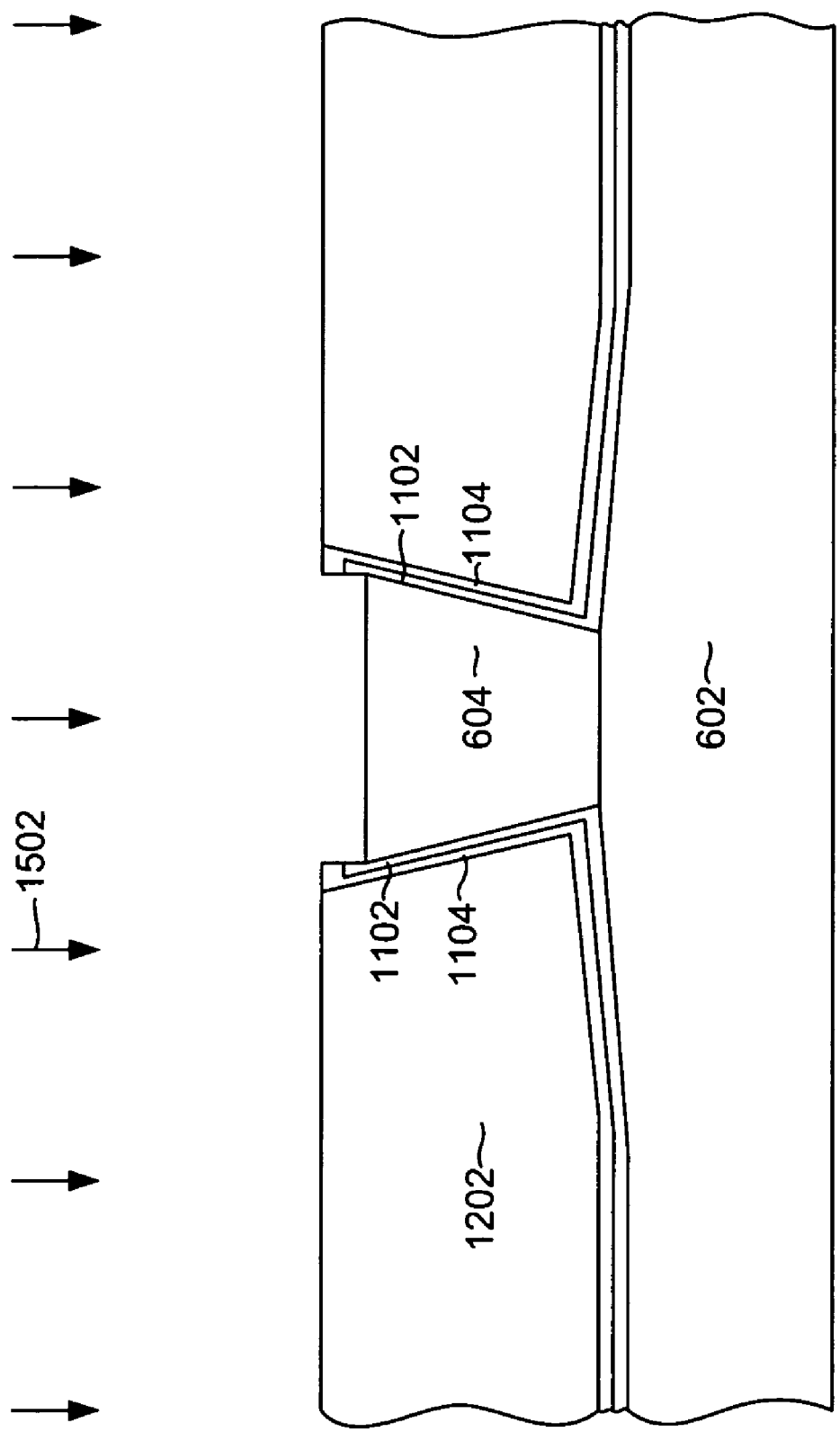

With reference to FIG. 15, another material removal process 1502 can be performed to remove the remaining alumina layer 1102 that extends over the top (trailing edge) of the write pole 604. The material removal process 1502 can be a reactive etch using tetramethylammonium hydroxide (TMAH etch), ion milling or some other process capable of removing alumina. Alternatively, the remaining alumina layer 1102 extending over the write pole 604 can be left intact and the material removal process 1502 not performed at all. In this case, the remaining alumina layer 1102 can be used to form all or a portion of the trailing shield gap layer.

Figure 16:
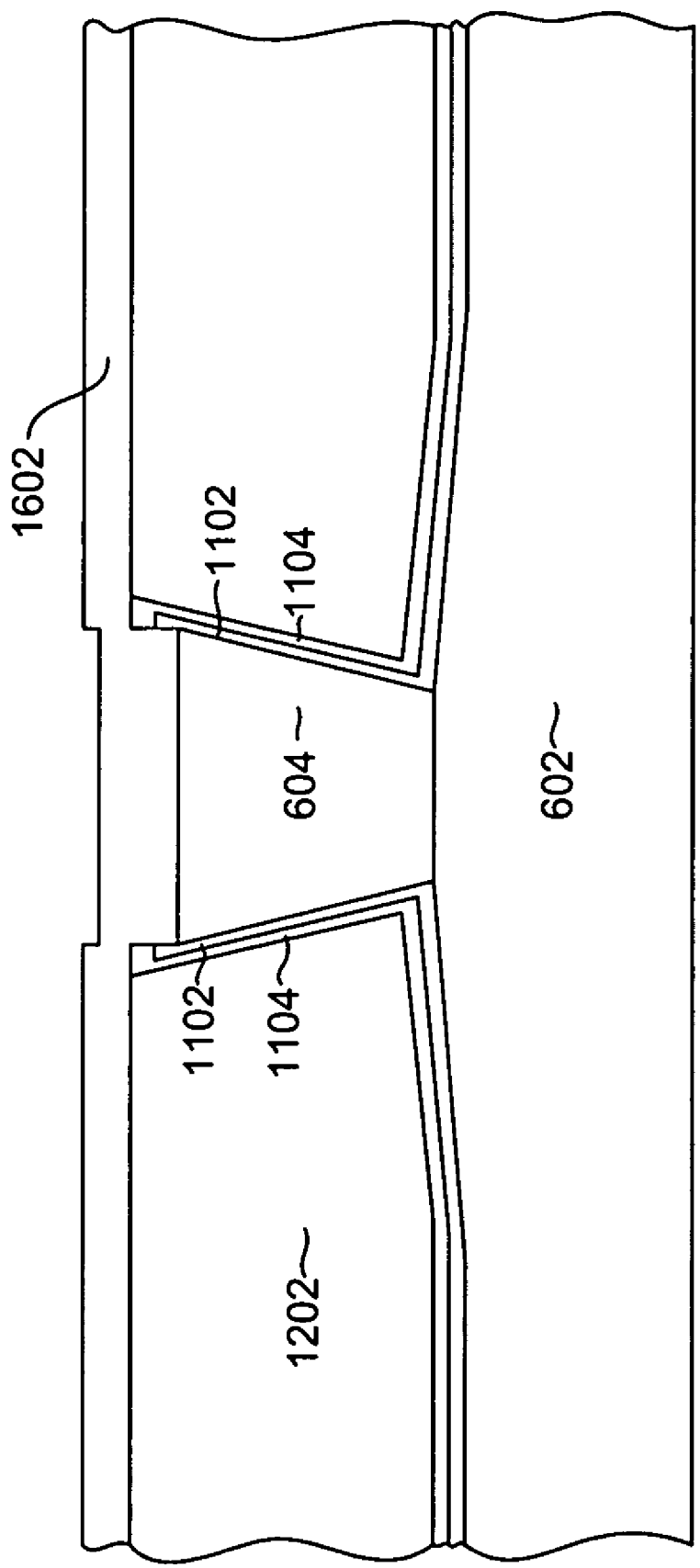
Figure 17:
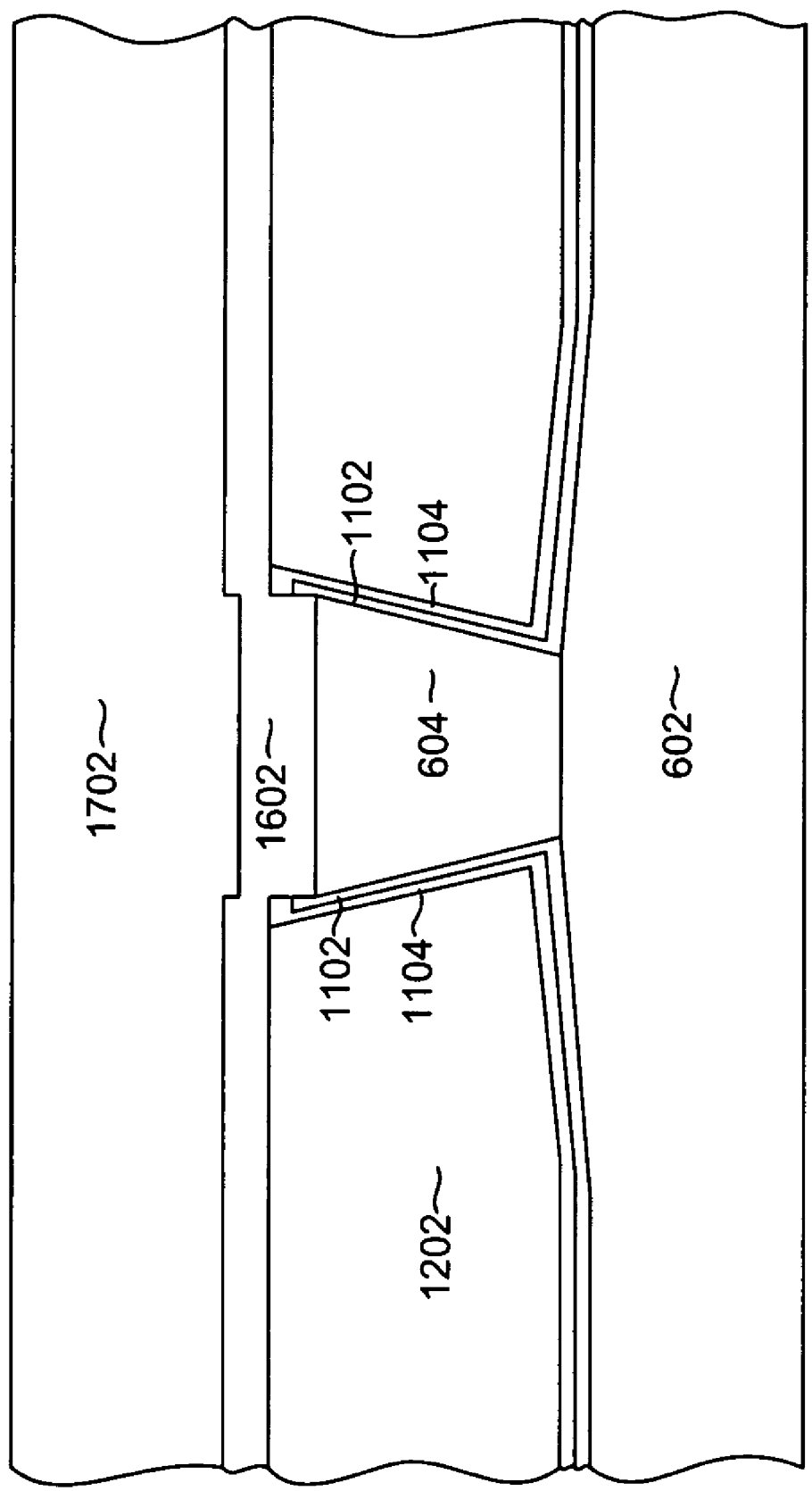

With reference now to FIG. 16, a layer of non-magnetic material 1602 such as Rh is deposited to provide a trailing shield gap layer. This Rh layer 1602 can be deposited to such a thickness to form a trailing shield gap having a thickness of 20 to 40 nm or about 30 nm. The Rh layer can function not only as a trailing shield gap, but, because it is electrically conductive, can function as a seed layer for depositing the trailing shield. The Rh layer provides flat surface on which to deposit the shield. With reference then to FIG. 17, a magnetic material 1702 such as NiFe is deposited to form a trailing magnetic shield.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for perpendicular magnetic recording, the method comprising:
    forming magnetic write pole;
    depositing a first layer of alumina over the write pole;
    depositing a first layer of Rh over the first layer of alumina;
    depositing a second layer of alumina over the first layer of Rh, the second layer of alumina being thicker than the first layer of alumina;
    performing a chemical mechanical polish sufficiently to expose a portion of the first layer of Rh;
    performing an ion mill to remove the exposed portion of the first Rh layer, thereby exposing a portion of the first alumina layer;
    removing the exposed portion of the first alumina layer;
    depositing a second Rh layer to a thickness of a desired trailing shield gap thickness; and
    depositing a magnetic material by electroplating to form a trailing shield.

2. The method as in claim 1 wherein the exposed portion of the first alumina layer is removed by ion milling.

3. The method as in claim 1 wherein the exposed portion of the first alumina layer is removed by TMAH etching.

4. The method as in claim 1 wherein the second Rh layer is deposited to a thickness of 20 to 40 nm.

5. The method as in claim 1 wherein the second Rh layer is deposited to a thickness of about 30 nm.

6. The method as in claim 1 wherein the depositing second Rh layer functions as an electrically conductive seed layer for deposition of the magnetic material.

7. The method as in claim 1 wherein the magnetic material comprises NiFe.

8. A method for manufacturing a magnetic write head for use in perpendicular magnetic recording, the method comprising:
    providing a substrate;
    depositing a magnetic write pole material over the substrate, the deposited magnetic write pole material having a thickness;
    forming a mask structure over the magnetic write pole material;

performing an ion mill to remove portions of the magnetic write pole material layer that are not covered by the mask structure;

removing the mask structure;

depositing a first layer of alumina;

depositing a first layer of Rh;

depositing a second layer of alumina to a thickness that is at least as great as the thickness of the magnetic write pole material;

performing a chemical mechanical polishing process (CMP) sufficiently to expose a portion of the first Rh layer;

removing the exposed portion of the first Rh layer, thereby exposing a portion of the first alumina layer;

removing the exposed portion of the first alumina layer;

depositing a second layer of Rh; and depositing a magnetic trailing shield material by electroplating using the second Rh layer as a seed layer.

9. The method as in claim 8 wherein the second Rh layer is deposited to a thickness of a desired trailing gap thickness.

10. The method as in claim 9 wherein the second Rh layer is deposited to a thickness of a thickness of 20-40 nm.

11. The method as in claim 9 wherein the second Rh layer is deposited to a thickness of about 30 nm.

* * * * *